(12) United States Patent
Thetford

(10) Patent No.: US 6,884,286 B2
(45) Date of Patent: Apr. 26, 2005

(54) DISPERSIONS CONTAINING POLYETHER DISPERSANTS

(75) Inventor: Dean Thetford, Manchester (GB)

(73) Assignee: The Lubrizol Corporation, Wickliffe, OH (US)

(*) Notice: Subject to any disclaimer, the term of this patent is extended or adjusted under 35 U.S.C. 154(b) by 132 days.

(21) Appl. No.: 10/344,553

(22) PCT Filed: Aug. 3, 2001

(86) PCT No.: PCT/GB01/03475

§ 371 (c)(1),
(2), (4) Date: Feb. 13, 2003

(87) PCT Pub. No.: WO02/16471

PCT Pub. Date: Feb. 28, 2002

(65) Prior Publication Data

US 2003/0172844 A1 Sep. 18, 2003

(30) Foreign Application Priority Data

Aug. 18, 2000 (GB) .............................. 0020414

(51) Int. Cl.$^7$ .............................................. C09D 11/00
(52) U.S. Cl. ............................... 106/31.58; 106/31.86; 106/170.46; 106/170.47; 106/191.1; 106/192.1; 106/287.22
(58) Field of Search ........................ 106/31.58, 31.86, 106/170.46, 170.47, 191.1, 192.1, 287.22

(56) References Cited

U.S. PATENT DOCUMENTS

| 4,923,515 A | * | 5/1990 | Koike et al. .............. 106/31.58 |
| 5,494,511 A | * | 2/1996 | Holbrook .................... 524/141 |
| 5,663,224 A | * | 9/1997 | Emmons et al. ............ 524/188 |
| 5,785,894 A | * | 7/1998 | Schofield et al. ............. 516/90 |
| 6,440,207 B1 | * | 8/2002 | Schulz ........................ 106/412 |
| 2002/0013494 A1 | * | 1/2002 | Carpenter et al. .......... 562/592 |

FOREIGN PATENT DOCUMENTS

| EP | 0 343 503 A1 | 11/1989 |
| WO | WO 98/44022 | 10/1998 |

* cited by examiner

*Primary Examiner*—Helene Klemanski
(74) *Attorney, Agent, or Firm*—Samuel B. Laferty; Morgan, Lewis & Bockius LLP

(57) ABSTRACT

A dispersion comprising a particulate solid, a polar organic liquid and a dispersant of formula (1) wherein R is optionally substituted $C_{4-50}$-hydrocarbyl; X is —O—, —S— or —NR$^2$—; R$^1$ is hydrogen or $C_{1-6}$-alkyl which may be linear or branched; R$^2$ is hydrogen or $C_{1-6}$, alkyl which may be linear or branched or a group —(C$_2$H$_4$O)$_n$(AO)$_p$—R$^1$; AO is alkyleneoxy containing 3 or more carbon atoms; n is 0 to 30; p is 4 to 100; and p>n; and a is from 1 to 3. Preferred compounds are where R$^1$ is hydrogen, X is —O— and a is 1 and R is the residue of 2-naphthol.

9 Claims, No Drawings

DISPERSIONS CONTAINING POLYETHER DISPERSANTS

The present invention relates to dispersions comprising a particulate solid such as a pigment, a polar organic liquid and a dispersant which is a block copolymer of an organic hydroxy, amine or thiol compound and one or more aliphatic epoxides such as propylene and butyleneoxide. The dispersion is particularly useful for preparing alcohol or alcohol-ester flexographic inks and polyol paint systems and for making millbases to be used in the preparation of such paints and inks. Some of the dispersants are novel.

Homopolymers obtained by reacting an epoxide containing 3 or more carbon atoms with an organic hydroxy compound have been disclosed in the patent literature. For example, β-naphthol-propoxylate (24) has been disclosed as an adjunct in an aqueous copper plating bath in U.S. Pat. No. 5,849,171. Polytetrahydrofuran mono ethers of $C_{1-20}$-alcohols have also been disclosed in U.S. Pat. No. 5,641,857 as intermediates for use in the preparation of polyurethane, polyester and polyamide elastomers.

Although there are numerous disclosures of block copolymers of ethylene oxide (EO) and propylene oxide (PO) attached to the residue of an organic hydroxy compound there are few disclosures where the EO repeat unit is attached to the organic hydroxy compound and where the PO repeat unit occurs at the end of the block copolymer, especially where the molar ratio of PO chain segment is greater than the EO chain segment. Of these, GB 1,497,666 discloses 2,4-dioctylphenol+15EO+20PO as an auxiliary in aqueous dye concentrate solutions; U.S. Pat. No. 4,836,951 discloses $C_9H_{19}OH+10EO+15PO$ and $C_{10}H_{21}OH+4EO+8PO$ and their use in mechanical dishwasher formulations and EP 197,001 discloses $C_{9-11}H_{19-23}OH+4EO+12PO$, $C_{12-13}H_{25-27}OH+8EO+12PO$ and $C_{9-11}H_{19-23}OH+7EO+8PO$ and $C_{9-11}H_{19-23}OH+8EO+12PO$ as intermediates for making anionic dispersants. However, none of these citations disclose or envisage the use as a dispersant in a polar organic liquid of an organic hydroxy compound which is a block copolymer of EO and then PO and wherein the molar amount of PO is greater than the molar amount of EO.

According to the invention there is provided a dispersion comprising a particulate solid, a polar organic liquid and a dispersant of formula 1

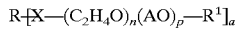

$$R-[X-(C_2H_4O)_n(AO)_p-R^1]_a \qquad 1$$

wherein
R is optionally substituted $C_{4-50}$-hydrocarbyl;
X is —O—, —S— or —NR²—;
R¹ is hydrogen or $C_{1-6}$-alkyl which may be linear or branched;
R² is hydrogen, $C_{1-6}$-alkyl which may be linear or branched or a group —$(C_2H_4O)_n (AO)_p$—R¹;
AO is alkyleneoxy containing 3 or more carbon atoms;
n is from 0 to 30;
p is from 4 to 100;
p>n; and
a is from 1 to 3.
Preferably X is —O— and a is 1.
It is also preferred that R¹ is H.

The hydrocarbyl group represented by R may be aryl, alkyl, alkenyl, alkynyl or cycloalkyl, all of which may be optionally substituted.

The substituents in the hydrocarbyl group may be one or more atoms of halogen, oxygen and nitrogen but it is preferred that R is unsubstituted by such atoms.

When R is aryl, it may be mono-or poly-cyclic such as phenyl, pyrenyl, anthracenyl 1-naphthyl and especially 2-naphthyl.

Thus, R may be the residue of a phenol, a 1-naphthol, a 2-naphthol a 1-naphthylamine or a 2-naphthylmercaptan. In the case where a is 2, R may be the residue of 1,2-, 1,3-, 1,5-, 1,6-, 2,3-, 2,6-, 2,7- and 1,4-dihydroxynaphthalene. Preferably R is the residue of 2-naphthol or a phenol.

Specific examples of phenols and naphthols from which R is obtainable are phenol, 2-naphthol, 4-alkyl substituted phenols such as octyl-and nonyl-phenol, 2-phenylphenol, 4-hydroxydiphenyl and styrenated phenol. By styrenated phenol is meant phenol which is substituted by one or more residues of formula —CH CH₃ Ph where Ph represents phenyl.

When R is alkyl, alkenyl or alkynyl it may be linear or branched and preferably contains not greater than 36, more preferably not greater than 24, even more preferably not greater than 18 and especially not greater than 12 carbon atoms. When R is alkyl, it is preferably the residue of an aliphatic alcohol, R—OH. Examples of suitable alcohols are n-hexanol, n-heptanol, n-octanol, n-decanol, n-dodecanol, n-stearyl alcohol, oleyl alcohol and especially branched chain alcohols such as 2-ethylbutanol, 3-heptanol, 2-ethylhexanol, 3,5,5-trimethylhexanol, 3,7-dimethyloctanol and the so-called Guerbet alcohols such as those commercially available under the trade name Isofol (ex Condea GmbH) including mixtures thereof. Specific examples of Guerbet alcohols are Isofol 12, 14T, 16, 18T, 18E, 20, 24, 28, 32, 32T and 36.

An example of alkenyl is the residue of oleyl alcohol and an example of alkynyl is the residue of acetylenic alcohols and diols such as those which are commercially available under the trade mark Surfynol from Air Products.

When R is alkyl it may also be the residue of a diol, triol or diamine where 'a' in formula 1 is 2 or 3.

When R is aralkyl, it is preferably benzyl or 2-phenylethyl.

When R is cycloalkyl it is preferably cyclohexyl.

When R is substituted aryl or aralkyl, the substituent is preferably aryl such as phenyl, $C_{1-20}$-alkyl, especially $C_{1-12}$-alkyl, $C_{1-20}$-alkoxy, especially $C_{1-6}$-alkoxy, aryloxy such as phenoxy, carboxylic acid, sulphonic acid, sulphonamide optionally substituted by one or two $C_{1-12}$-alkyl and especially $C_{1-6}$-alkyl groups which may be the same or different, aryl and alkylsulphonyl such as phenylsulphonyl and $C_{1-12}$-alkylsulphonyl, halogen such as iodine, bromine and especially chlorine, cyano and amino including secondary and tertiary amino. In the case of secondary and tertiary amino, the substituents on nitrogen may be aryl, such as phenyl, and $C_{1-12}$-alkyl.

When R is substituted aryl the substituent may also be styryl and R may be residue of a styrenated phenol such as those available from Raschig under the trade is mark Ralox.

When R is substituted alkyl or cycloalkyl, the substituent is preferably $C_{1-20}$-alkoxy, especially $C_{1-16}$-alkoxy, aryloxy such as phenoxy, carboxylic acid, sulphonic acid, sulphonamide optionally substituted by one or two $C_{1-12}$-alkyl and especially $C_{1-6}$-alkyl groups which may be the same as different, aryl and alkylsulphonyl such as phenylsulphonyl and $C_{1-12}$-alkylsulphonyl, halogen such as iodine, bromine and especially chlorine, cyano and amino including secondary and tertiary amino, in the case of secondary and tertiary amino, the substituents on nitrogen may be aryl, such as phenyl, and $C_{1-12}$-alkyl.

When the substituent is sulphonic or carboxylic acid, the acid group may be present as the free acid or it may be present in the form of a salt with a metal, amine or quaternary ammonium cation, including mixtures thereof. Examples of suitable metals are the alkali metals such as sodium, potassium and lithium and alkali earth metals such as calcium, magnesium and barium, including mixtures thereof. The amine is preferably aliphatic and may be primary, secondary or tertiary. Examples of suitable amines are ethylamine, diethylamine, triethylamine, octylamine, dioctylamine, decylamine and dodecylamine. Preferably, the quaternary ammonium cation contains at least one aliphatic chain containing 6 or more carbon atoms and includes benzalkonium cations.

The residue —AO— preferably contains 3 or 4 carbon atoms and is preferably propoxy (i.e. —$CH_2CH_2CH_2$—O—), 2-methylethoxy (i.e. —$CH(CH_3)CH_2$—O—), butoxy (i.e. —$CH_2$—$CH_2$—$CH_2$—$CH_2O$—) and 2-ethylethoxy (i.e. —$CH(C_2H_5)CH_2O$—), including mixtures thereof. 2-Methylethoxy is much preferred.

The integer n is preferably not greater than 20, more preferably not greater than 10 and especially not greater than 4. It is especially preferred that n is zero.

Preferably, p is not greater than 100, more preferably not greater than 80, even more preferably not greater than 60 and especially not greater than 50. Particularly useful dispersions have been obtained where p is not greater than 40 more preferably not greater than 30 and especially not greater than 24.

Particularly useful dispersions have been obtained, where the dispersant is 2-methylethoxylated 2-naphthol.

The dispersants may be prepared by any method known to the art. Thus, for example, where —AO— represents propoxy, 2-methylethoxy or 2-ethylethoxy the dispersant may be conveniently prepared by reacting a hydroxy compound of formula 2.

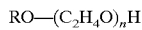   Formula 2 wherein R and 'n' are as defined hereinbefore with the appropriate epoxide under anhydrous conditions and preferably in the presence of a base such as an alkali metal hydroxide, for example, sodium hydroxide. The reaction is normally carried out at temperatures between 100 and 160°, and preferably under pressure.

Where —AO— is butoxy (i.e. —$CH_2$ $CH_2$ $CH_2$ $CH_2$—O—), the dispersants are conveniently prepared by reacting a hydroxy compound of formula 2 with tetrahydrofuran in the presence of complex anions such as $PF_6^-$, $AsF_6^-$, $SbF_6^-$, $SbCl_6^-$, $BF_4^-$, $SO_3CF_3^-$, $SO_3F^-$ and $ClO_4^-$. Typical reaction conditions are given in Chapter 3, "Polymerisation" page 17–74 of Poly(tetrahydrofuran), P Dreyfuss, Publisher Gordon and Breach, New York 1982

It will be clear to the skilled person that variants on the above preparations may be easily carried out whereby the compound of formula 2 is first reacted with tetrahydrofuran and subsequently with propyleneoxide, 2-methylethylene oxide and/or 2-ethylethyleneoxide. Similarly, the compound of formula 2 may be first reacted with propyleneoxide, 2-methylethyleneoxide and/or 2-ethylethyleneoxide and subsequently with tetrahydrofuran.

When the dispersant of formula 1 contains the group $R^1$ which is $C_{1-16}$-alkyl, such dispersants are easily prepared by reacting the dispersant of formula 1 wherein $R^1$ is hydrogen with an appropriate alkylating reagent such as an alkyl halide (e.g. chloride) or dialkylsulphate.

Where X in the dispersant of formula 1 is —S— or —$NR^2$— the dispersants may be prepared in similar manner to those where X is —O— as represented by the hydroxy compound of formula 2 above.

As noted hereinbefore, some of the dispersants of formula 1 are novel. Hence, as a further aspect of the invention there is provided a compound of formula 1

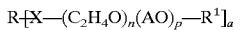   Formula 1 wherein R, $R^1$, X, a, n and p are as defined hereinbefore, with the exception of

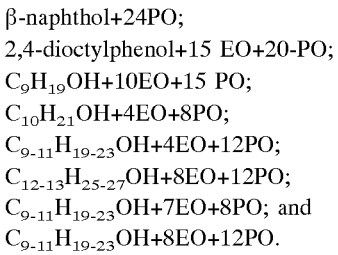

Preferred compounds are those wherein R is the residue of a branched aliphatic alcohol, 2-naphthol or alkyl substituted phenol The particulate solid present in the dispersion may be any inorganic or organic solid material which is substantially insoluble in the polar organic liquid at the temperature concerned and which it is desired to stabilise in a finely divided form therein.

Examples of suitable solids are pigments for solvent inks; pigments, extenders and fillers for paints and plastics materials; dyes, especially disperse dyes; optical brightening agents and textile auxiliaries for solvent dyebaths, inks and other solvent application systems; solids for oil-based and invert-emulsion drilling muds; dirt and solid particles in dry cleaning fluids; particulate ceramic materials; magnetic materials and magnetic recording media, and biocides, agrochemicals and pharmaceuticals which are applied as dispersions in organic media.

A preferred solid is an organic pigment from any of the recognized classes of pigments described, for example, in the Third Edition of the Colour Index (1971) and subsequent revisions of, and supplements thereto, under the chapter headed "Pigments". Examples of organic pigments are those from the azo, disazo, condensed azo, thioindigo, indanthrone, isoindanthrone, anthanthrone, anthraquinone, isodibenzanthrone, triphendioxazine, quinacridone and phthalocyanine series, especially copper phthalocyanine and its nuclear halogenated derivatives, and also lakes of acid, basic and mordant dyes. Carbon black, although strictly inorganic, behaves more like an organic pigment in its dispersing properties. Preferred organic pigments are phthalocyanines, especially copper phthalocyanines, monoazos, disazos, indanthrones, anthranthrones, quinacridones and carbon blacks.

Other preferred solids are agrochemicals such as the fungicides flutriafen, carbendazim, chlorothalonil and mancozeb.

The polar organic liquid present in the dispersions of the invention may be used alone or in admixture with a substantially non-polar organic liquid or it may contain up to 10% by weight of water. By the term "polar" in relation to the organic medium is meant an organic liquid or resin capable of forming moderate to strong bonds as described in the article entitled "A Three Dimensional Approach to Solubility" by Crowley et al in Journal of Paint Technology, Vol. 38, 1966, at page 269. Such organic media generally have a hydrogen bonding number of 5 or more as defined in the above mentioned article.

Examples of suitable polar organic liquids are amines, ethers, especially lower alkyl ethers, organic acids, esters, ketones, glycols, alcohols and amides. Numerous specific examples of such moderately strongly hydrogen bonding liquids are given in the book entitled "Compatibility and Solubility" by Ibert Mellan (published in 1968 by Noyes Development Corporation) in Table 2.14 on pages 39–40 and these liquids all fall within the scope of the term polar organic liquid as used herein.

Preferred polar organic liquids are dialkyl ketones, alkyl esters of alkane carboxylic acids and alkanols, especially such liquids containing up to, and including, a total of 6 carbon atoms. As examples of the preferred and especially preferred liquids there may be mentioned dialkyl and cycloalkyl ketones, such as acetone, methyl ethyl ketone, diethyl ketone, di-isopropyl ketone, methyl isobutyl ketone, di-isobutyl ketone, methyl isoamyl ketone, methyl n-amyl ketone and cyclohexanone; alkyl esters such as methyl acetate, ethyl acetate, isopropyl acetate, butyl acetate, ethyl formate, methyl propionate, methoxy propylacetate and ethyl butyrate; glycols and glycol esters and ethers, such as ethylene glycol, 2-ethoxyethanol, 3-methoxypropylpropanol, 3-ethoxypropylpropanol, 2-butoxyethyl acetate, 3-methoxypropyl acetate, 3-ethoxypropyl acetate and 2-ethoxyethyl acetate; alkanols such as methanol, ethanol, $\underline{n}$-propanol, isopropanol, $\underline{n}$-butanol and isobutanol and dialkyl and cyclic ethers such as diethyl ether and tetrahydrofuran.

The substantially non-polar organic liquid which may be used in admixture with the polar organic liquid may be aliphatic, aromatic or a halogenated aliphatic or aromatic organic liquid. Examples of such non-polar liquids are hexane, heptane, octane, petroleum distillates such as white spirits, toluene, xylene, chlorobenzene, dichlorobenzene, trichloroethylene and perchloroethylene, including mixtures thereof. Other non-polar organic liquids are organic esters, especially those which are used as plasticisers for plastics materials and composites, such as adipates and phthalates.

Preferably, the polar organic liquid contains not greater than 10% and especially not greater than 5% by weight of the non-polar organic liquid. It is much preferred that the polar organic liquid is substantially free from non-polar organic liquid.

When the polar organic liquid contains water it is preferably not greater than 5% and especially not greater than 2% by weight based on the amount of polar organic liquid. It is especially preferred that the polar organic liquid is substantially free from water.

Examples of suitable resins, which can be used as polar organic liquid are film-forming resins such as are suitable for the preparation of inks, paints and chips for use in various applications such as paints and inks. Examples of such resins include polyamides, such as Versamid™ and Wolfamid™, and cellulose ethers, such as ethyl cellulose and ethyl hydroxyethyl cellulose, nitrocellulose and cellulose acetate butyrate resins, including mixtures thereof. Examples of paint resins include short oil alkyd/melamine-formaldehyde, polyester/melamine-formaldehyde, thermosetting acrylic/melamine-formaldehyde, long oil alkyd, polyether polyols and multi-media resins such as acrylic and urea/aldehyde.

If desired, the dispersions may contain other ingredients, for example resins (where these do not already constitute the organic medium) binders, fluidising agents (such as those described in GB-A-1508576 and GB-A-2108143), anti-sedimentation agents, plasticisers, levelling agents and preservatives.

The dispersions typically contains from 5 to 95% by weight of the solid, the precise is quantity depending on the nature of the solid and the quantity depending on the nature of the solid and the relative densities of the solid and the polar organic liquid. For example, a dispersion in which the solid is an organic material, such as an organic pigment, preferably contains from 15 to 60% by weight of the solid whereas a dispersion in which the solid is an inorganic material, such as an inorganic pigment, filler or extender, preferably contains from 40 to 90% by weight of the solid based on the total weight of dispersion.

The dispersion may be obtained by any of the conventional methods known for preparing dispersions. Thus, the solid, the organic medium and the dispersant may be mixed in any order, the mixture then being subjected to a mechanical treatment to reduce the particles of the solid to an appropriate size, for example by ball milling, bead milling, gravel milling or plastic milling until the dispersion is formed. Alternatively, the solid may be treated to reduce its particle size independently or in admixture with either the organic medium or the dispersant, the other ingredient or ingredients then being added and the mixture being agitated to provide the dispersion.

If a composition is required comprising particulate solid and dispersant in dry form, the polar organic liquid is preferably volatile so that it may be readily removed from the particulate solid by a simple separation means such as evaporation. It is preferred, however, that the composition comprises the polar organic liquid.

If the dry composition consists essentially of the dispersant and the particulate solid, it preferably contains at least 0.2%, more preferably at least 0.5% and especially at least 1.0% dispersant based on weight of the particulate solid. Preferably the dry composition contains not greater than 100%, preferably not greater than 50%, more preferably not greater than 20% and especially not greater than 10% by weight based on the weight of the particulate solid.

As described hereinbefore, the dispersions of the invention are particularly suitable for preparing mill-bases where the particulate solid is milled in a polar organic liquid in the presence of both a particulate solid and a film-forming resin binder.

Thus, according to a still further aspect of the invention there is provided a mill-base comprising a particulate solid, dispersant, polar organic liquid and a film-forming resin.

Typically, the mill-base contains from 20 to 70% by weight particulate solid based on the total weight of the mill-base. Preferably, the particulate solid is not less than 30 and especially not less than 50% by weight of the mill-base.

The amount of resin in the mill-base can vary over wide limits but is preferably not less than 10%, and especially not less than 20% by weight of the continuous/liquid phase of the mill-base. Preferably, the amount of resin is not greater than 50% and especially not greater than 40% by weight of the continuous/liquid phase of the mill-base.

The amount of dispersant in the mill-base is dependent on the amount of particulate solid but is preferably from 0.5 to 5% by weight of the mill-base.

Dispersions and mill bases containing the dispersants of the invention are particularly suitable for use in paints, especially high solids paints, inks, especially flexographic, gravure and screen inks, and non-aqueous ceramic processes, especially tape-coating, doctor-blade, extrusion and injection moulding type processes.

The inks prepared using the dispersions of the present invention exhibit superior properties such as gloss, optical density, crinkle-resistance and moisture resistance compared with inks prepared from dispersions containing ethoxylated dispersants.

The invention is further illustrated by the following examples wherein all references to amounts are in parts by weight unless indicated to the contrary.

PREPARATIVE EXAMPLE 1

Styrenated Phenol +5PO

Styrenated phenol (102 parts, 0.32M as Ralox 316 ex Raschig) and sodium hydroxide pellets (2 parts) were charged to a pressure vessel which had been purged with nitrogen. The vessel was pressurised to 10 psi and the contents were heated to 155° C. with stirring. Propyleneoxide (103 parts) was added over 9 hours with stirring at 155° C. The contents were then cooled and the product was partly removed as a pale yellow liquid (96.3 parts).

PREPARATIVE EXAMPLE 2

Styrenated Phenol +20 PO

Sodium hydroxide pellets (0.3 parts) was added to the vessel containing styrenated phenol +5 PO (100 parts, 0.165M ex Example 1). The vessel was again purged with nitrogen and heated to 155° C. with stirring. Propylene oxide (155 parts) was added over 10 hours. After cooling, the product was obtained as a pale yellow liquid (218 parts)

Examples 1 and 2 and Comparative Examples A to H

A mill base was prepared by dissolving a dispersant (0.25 parts) in a 16% (w/w) solution of nitrocellulose resin in ethanol (7.25 parts, SM 1359 ex Nobel) with heat as necessary. 3 mm Diameter glass beads (17 parts) and carbon black pigment (2.5 parts, Special Black 250 ex Degussa) were added and milling was carried out for 16 hours on a horizontal shaker. The fluidity of the resultant mill base were determined by handshaking and assessed using an arbitrary scale of A to E (good to poor). The results are given in Table 1 below.

The beads were then separated and the millbase was letdown to form an ink by mixing with 26.6% (w/w) nitrocellulose resin in ethanol (7.14 parts, SM 1359 ex Nobel), dioctylphthalate (0.62 parts ex Aldrich) and a 5:1 (w/w) mixture of ethanol and ethylacetate (3.07 parts). The resultant ink was drawn down onto a white card using a No. 4 K-bar and dried for 1 hours at 40° C. The haze and gloss at 20° and 60° was measured using a Byk-Gardner Haze-Gloss Reflectometer, the O.D was measured using a Macbeth RD918 Densitometer and the L, a, b co-ordinater were measured using a Spectroflash SF600 Spectrophotometer.

The results are given in Table 1 below and show that the dispersants carrying a terminal propoxy chain exhibit superior properties to those dispersants having a terminal ethoxy chain, especially in respect of fluidity, haze and gloss.

TABLE 1

| Example | Dispersant | Fluidity | Haze | 20° gloss | 60° gloss | O.D | L | a | b |
|---|---|---|---|---|---|---|---|---|---|
| 1 | 2-naphthol + 10PO | C | 367 | 30.7 | 85.7 | 1.943 | 10.34 | −0.33 | −2.86 |
| 2 | 2-naphthol + 20PO | B/C | 410 | 37.7 | 92.0 | 2.009 | 9.08 | 0.27 | −3.23 |
| A | 2-naphthol + 5EO | D | | | | | | | |
| B | 2-naphthol + 15EO | D | | | | | | | |
| C | 2-naphthol + 50EO | D | | | | | | | |
| D | 2-naphthol + 10PO + 10EO | C/D | 168 | 7.3 | 53.0 | 1.701 | 15.60 | 0 | −2.54 |
| E | 2-naphthol + 10PO + 15EO | D | | | | | | | |
| F | 2-naphthol + 15PO + 15EO | D/E | | | | | | | |
| G | 2-naphthol + 10PO + 20EO | C/D | 101 | 2.7 | 38.2 | 1624 | 17.50 | +0.02 | −2.22 |
| H | 2-naphthol + 15PO + 20EO | C/D | 243 | 11.6 | 62.7 | 1.777 | 13.85 | −0.12 | −2.57 |

Examples 3 to 24 and Comparative Examples I to N

Examples 1 and 2 were repeated except using the dispersants shown in Table 2 below.

TABLE 2

| Example | Dispersant | Fluidity | Haze | 20° gloss | 60° gloss | O.D |
|---|---|---|---|---|---|---|
| 3 | 2-naphthol + 13EO + 14PO | C | 422 | 33.2 | 89.6 | 2.047 |
| 4 | 2-naphthol + 13EO + 29PO | B/C | 440 | 34.4 | 91.6 | 2.067 |
| 5 | 1-dodecanol + 12PO | B/C | 425 | 39.4 | 95.2 | 2.087 |
| 6 | 1-naphthol + 14PO | C | 433 | 33.7 | 91.0 | 2.068 |
| 7 | 1-octadecanol + 13PO | B/C | 433 | 39.3 | 95.0 | 2.091 |
| 8 | 1-octadecanol + 20PO | C | 437 | 40.6 | 95.6 | 2.099 |
| 9 | 1-naphthalenemethaflol + 5PO | C | 412 | 37.8 | 94.1 | 2.068 |
| 10 | 1-naphthalenemethanol + 16PO | B/C | 424 | 38.7 | 95.0 | 2.078 |
| I | 1,6-dihydroxynaphthalene + 4PO | C | 362 | 26.8 | 83.8 | 1.949 |
| 11 | 1,6-dihydroxynaphthalene + 19PO | B/C | 419 | 36.0 | 92.5 | 2.030 |
| 12 | 1,6-dihydroxynaphthalene + 30PO | B/C | 434 | 40.1 | 95.3 | 2.071 |
| 13 | 2-butyl-1-octanol + 5EO + 9PO | B/C | 452 | 36.1 | 92.9 | 2.080 |
| 14 | 2-butyl-1-octanol + 5EO + 17PO | B/C | 450 | 39.1 | 95.6 | 2.085 |
| 15 | 2-naphthol + 13EO + 80PO | B | 388 | 36.5 | 90.2 | 2.027 |
| J | 2-naphthol + 13EO + 104PO | B/C | 425 | 19.1 | 74.4 | 2.011 |
| K | MeO PEG (350) + 2PO | C/D | 407 | 20.5 | 74.4 | 2.008 |
| L | MeO PEG (350) + 8PO | C | 403 | 20.0 | 74.2 | 2.011 |

TABLE 2-continued

| Example | Dispersant | Fluidity | Haze | 20° gloss | 60° gloss | O.D |
|---|---|---|---|---|---|---|
| 16 | Phenol + 17PO | A/B | 296 | 47.3 | 96.7 | 1.966 |
| 17 | N-phenyl-1-naphthylamine + 7PO | A/B | 379 | 36.2 | 91.5 | 1.943 |
| 18 | 4-nonylphenol + 5PO | B/C | 335 | 33.7 | 86.1 | 1.987 |
| M | 2-phenylphenol + 12EO + 6PO | B/C | 319 | 27.4 | 81.1 | 1.964 |
| 19 | 2-phenylphenol + 12EO + 16PO | B | 394 | 32.4 | 89.8 | 1.991 |
| 20 | 2-phenylphenol + 12EO + 21PO | B/C | 292 | 40.5 | 89.5 | 2.005 |
| 21 | Styrenatedphenol + 5PO | B/C | 482 | 20..6 | 80.4 | 2.000 |
| 22 | Styrenatedphenol + 20PO | B | 306 | 48.1 | 97.6 | 2.001 |
| 23 | 2-naphthol + 71PO | B/C | 372 | 36.9 | 90.5 | 2.026 |
| N | MeO PPG (1500) | B | 441 | 25.3 | 84.4 | 1.976 |
| 24 | BuO PPG (1000) | A/B | 418 | 28.6 | 87.1 | 1.985 |
| Control | — | C | 374 | 28.8 | 86.3 | 1.852 |

Footnote to Table 2
OD is optical density.
EO is ethyleneoxide unit and PO is 2-methylethyleneoxide unit (propyleneoxide).
Comparative Example I contains an average of 2PO units on each —OH group.
2-butyl-1-octanol is Isofol 12 ex Condea GmbH (Examples 13 + 14)
Styrenated phenol is Ralox 316 ex Raschig (Examples 21 + 22)

Examples 25 to 30

Examples 1 and 2 were repeated except using 2.25 parts Pigment Red 57.1 (Lithol Rubine D4576 ex BASF) in place of the carbon black, with 0.15 parts dispersant and 7.6 parts nitrocellulose resin. After milling, the millbase was let down with a total of 10 parts of nitrocellulose resin, ethanol, ethylacetate and dioctylphthalate as described in Examples 1 and 2. The results are given in Table 3 below.

TABLE 3

| Example | Dispersant | Fluidity | Haze | 20° gloss | 60° gloss |
|---|---|---|---|---|---|
| 25 | 1-dodecanol + 12PO | C | 566 | 40.1 | 99.4 |
| 26 | 1-octadecanol + 20PO | C/D | 542 | 39.3 | 97.0 |
| 27 | 1-naphthalenemethanol + 16PO | C/D | 547 | 36.3 | 96.2 |
| 28 | 2-butyl-1-octanol + 5EO + 9PO | C/D | 556 | 34.0 | 93.9 |
| 29 | Phenol + 17PO | C/D | 550 | 34.8 | 94.8 |
| 30 | N-phenyl-1-naphthylamine + 7PO | C/D | 557 | 36.3 | 95.3 |
| Control | — | C/D | 571 | 26.9 | 86.2 |

Footnote to Table 3
EO and PO are as described in the footnote to Table 2.

What is claimed is:

1. A dispersion comprising a particulate solid, a polar organic liquid optionally containing up to 10% by weight water and a dispersant of formula 1

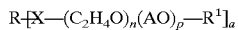  Formula 1 wherein
R is optionally substituted $C_{4-50}$-hydrocarbyl;
X is —O— or —S—;
$R^1$ is hydrogen or $C_{1-6}$-alkyl which may be linear or branched;
AO is alkyleneoxy containing 3 or more carbon atoms;
n is zero;
p is 4 to 100; and
p>n; and
a is 1.

2. A dispersion as claimed in claim 1 wherein X is —O—.
3. A dispersion as claimed in either claim 1 or claim 2 wherein $R^1$ is hydrogen.
4. A dispersion as claimed in claim 1 or claim 2 wherein R is 2-naphthyl.
5. A dispersion is claimed in claim 1 or claim 2 wherein AO is 2-methylethoxy.
6. A dispersion as claimed in claim 1 or claim 2 wherein p is not greater than 80.
7. A millbase comprising a particulate solid, a polar organic liquid, optionally containing up to 10% by weight water, a film-forming binder resin and a dispersant of formula 1

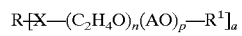  Formula 1 wherein
R is optionally substituted $C_{4-50}$-hydrocarbyl;
X is —O— or —S—;
$R^1$ is hydrogen or $C_{1-6}$-alkyl which may be linear or branched;
AO is alkyleneoxy containing 3 or more carbon atoms;
n is zero;
p is 4 to 100; and
p>n; and
a is 1.

8. A paint or ink comprising a particulate solid, a polar organic liquid, optionally containing up to 10% be weight water, a film-forming binder resin and a dispersant of formula 1.

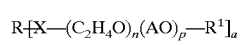  Formula 1 wherein
R is optionally substituted $C_{4-50}$-hydrocarbyl;
X is —O— or —S—;
$R^1$ is hydrogen or $C_{1-6}$-alkyl which may be linear or branched;
AO is alkyleneoxy containing 3 or more carbon atoms;
n is zero;
p is 4 to 100; and
p>n; and
a is 1.

9. A composition comprising a particulate solid selected from the group consisting of pigments, extenders, fillers, solids for oil-based and invert emulsion drilling muds, dirt and solid particles in dry cleaning fluids, ceramic materials, magnetic materials, biocides, agrochemicals and pharmaceuticals and a dispersant of formula 1.

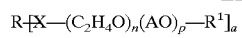 Formula 1
wherein
R is optionally substituted $C_{4-50}$-hydrocarbyl;
X is —O— or —S—;
$R^1$ is hydrogen or $C_{1-6}$-alkyl which may be linear or branched;
AO is alkyleneoxy containing 3 or more carbon atoms;
n is zero;
p is 4 to 100; and
p>n; and
a is 1.
* * * * *